(12) United States Patent
Gassend et al.

(10) Patent No.: US 12,449,669 B2
(45) Date of Patent: Oct. 21, 2025

(54) LIDAR TRANSMITTER AND RECEIVER OPTICS

(71) Applicant: Waymo LLC, Mountain View, CA (US)

(72) Inventors: Blaise Gassend, East Palo Alto, CA (US); Ralph Shepard, Menlo Park, CA (US); Pierre-Yves Droz, Los Altos, CA (US)

(73) Assignee: Waymo LLC, Mountain View, CA (US)

( * ) Notice: Subject to any disclaimer, the term of this patent is extended or adjusted under 35 U.S.C. 154(b) by 1080 days.

(21) Appl. No.: 17/435,601

(22) PCT Filed: Mar. 2, 2020

(86) PCT No.: PCT/US2020/020648
§ 371 (c)(1),
(2) Date: Sep. 1, 2021

(87) PCT Pub. No.: WO2020/180786
PCT Pub. Date: Sep. 10, 2020

(65) Prior Publication Data
US 2022/0155457 A1    May 19, 2022

Related U.S. Application Data

(60) Provisional application No. 62/813,867, filed on Mar. 5, 2019.

(51) Int. Cl.
*G01S 17/931* (2020.01)
*G01S 7/481* (2006.01)
(Continued)

(52) U.S. Cl.
CPC ........ *G02B 27/0916* (2013.01); *G01S 7/4813* (2013.01); *G01S 7/4814* (2013.01);
(Continued)

(58) Field of Classification Search
CPC ............ G02B 27/0916; G02B 27/0922; G02B 27/0966; G01S 17/931; G01S 7/4813;
(Continued)

(56) References Cited

U.S. PATENT DOCUMENTS

| 6,044,096 A | 3/2000 | Wolak et al. |
| 8,836,922 B1 | 9/2014 | Pennecot et al. |

(Continued)

FOREIGN PATENT DOCUMENTS

| JP | H03014478 | 2/1991 |
| JP | 2015203758 | 11/2015 |

(Continued)

OTHER PUBLICATIONS

International Searching Authority, International Search Report and Written Opinion mailed on Jun. 29, 2020, issued in connection with International Patent Application No. PCT/US2020/020648 filed on Mar. 2, 2020, 10 pages.

(Continued)

*Primary Examiner* — Stephone B Allen
*Assistant Examiner* — Boutsikaris Leonidas
(74) *Attorney, Agent, or Firm* — McDonnell Boehnen Hulbert & Berghoff LLP

(57) ABSTRACT

The present disclosure relates to optical systems and related methods of their use. An example optical system includes a transmitter. The transmitter includes a light emitter device configured to emit emission light. The light emitter device defines a reference plane. The transmitter also includes a fast axis collimation (FAC) lens optically coupled to the light emitter device. A lens axis of the FAC lens is arranged at a non-zero angle with respect to the reference plane. The transmitter also includes a transmit lens optically coupled to the FAC lens. The optical system also includes a receiver.

(Continued)

The receiver includes a receive lens and a light detector optically coupled to the receive lens.

20 Claims, 14 Drawing Sheets

(51) Int. Cl.
   *G01S 17/89* (2020.01)
   *G02B 27/09* (2006.01)
   *H01S 5/00* (2006.01)
(52) U.S. Cl.
   CPC .......... *G01S 7/4816* (2013.01); *G01S 7/4817* (2013.01); *G01S 17/89* (2013.01); *G01S 17/931* (2020.01); *G02B 27/0922* (2013.01); *G02B 27/0966* (2013.01); *H01S 5/005* (2013.01)
(58) Field of Classification Search
   CPC .... G01S 7/4814; G01S 7/4816; G01S 7/4817; G01S 17/89
   USPC ......................................................... 359/641
   See application file for complete search history.

(56) References Cited

U.S. PATENT DOCUMENTS

| | | | |
|---|---|---|---|
| 10,003,168 B1 | 6/2018 | Villeneuve | |
| 10,211,593 B1 | 2/2019 | Lingvay et al. | |
| 2004/0164309 A1 | 8/2004 | Okano et al. | |
| 2007/0116079 A1* | 5/2007 | Giniunas | G02B 27/0961 372/69 |
| 2008/0084905 A1 | 4/2008 | Doerfel et al. | |
| 2009/0279069 A1* | 11/2009 | Jensen | G01S 7/4814 356/5.1 |
| 2014/0064305 A1 | 3/2014 | Sipes et al. | |
| 2016/0048028 A1 | 2/2016 | Deutsch et al. | |
| 2017/0122728 A1 | 5/2017 | Kipfer et al. | |
| 2017/0329147 A1* | 11/2017 | Deutsch | G02B 27/108 |
| 2018/0143309 A1 | 5/2018 | Pennecot et al. | |
| 2018/0267152 A1 | 9/2018 | McMichael et al. | |
| 2018/0316160 A1 | 11/2018 | Raring et al. | |
| 2019/0235081 A1* | 8/2019 | Smits | G01S 17/931 |
| 2019/0252863 A1* | 8/2019 | Chen | G02B 19/0057 |
| 2020/0217954 A1* | 7/2020 | Hall | G05D 1/247 |
| 2021/0356736 A1* | 11/2021 | Huang | G02B 26/0875 |

FOREIGN PATENT DOCUMENTS

| | | |
|---|---|---|
| JP | 2016534346 | 11/2016 |
| WO | 2015/026471 | 2/2016 |
| WO | 2017/010176 | 1/2017 |
| WO | 2018/091970 | 5/2018 |

OTHER PUBLICATIONS

Japanese Patent Office, Office Action mailed May 19, 2023, issued in connection with Japanese Patent Application No. 2021-552214, 11 pages (including English translation).
European Patent Office, Extended European Search Report mailed on Sep. 13, 2022, issued in connection with European Patent Application No. 20766671.0, 7 pages.

* cited by examiner

LIDAR TRANSMITTER AND RECEIVER OPTICS

CROSS-REFERENCE TO RELATED APPLICATIONS

This application is a national stage application under 35 U.S.C. § 371 of International Application No. PCT/US2020/020648, filed Mar. 2, 2020, which claims the benefit of priority from U.S. Provisional Application No. 62/813,867, filed Mar. 5, 2019. The disclosures of all of the above applications are incorporated by reference herein in their entireties.

BACKGROUND

A conventional Light Detection and Ranging (LIDAR) system may utilize a light-emitting transmitter (e.g., a laser diode) to emit light pulses into an environment. Emitted light pulses that interact with (e.g., reflect from) objects in the environment can be received by a receiver (e.g., a photodetector) of the LIDAR system. Range information about the objects in the environment can be determined based on a time difference between an initial time when a light pulse is emitted and a subsequent time when the reflected light pulse is received.

SUMMARY

The present disclosure generally relates to optical systems (e.g., LIDAR or lidar systems) and certain aspects of their transmitter and receiver subsystems.

In a first aspect, an optical system is provided. The optical system includes a transmitter. The transmitter includes a light emitter device configured to emit emission light. The light emitter device defines a reference plane. The transmitter includes a fast axis collimation (FAC) lens optically coupled to the light emitter device. A lens axis of the FAC lens is at a non-zero angle with respect to the reference plane. The transmitter includes a transmit lens optically coupled to the FAC lens. The optical system includes a receiver. The receiver includes a receive lens and a light detector optically coupled to the receive lens.

In a second aspect, a vehicle is provided. The vehicle includes an optical system. The optical system includes a transmitter and a receiver. The transmitter includes a light emitter device configured to emit emission light. The light emitter device defines a reference plane. The transmitter also includes a fast axis collimation (FAC) lens optically coupled to the light emitter device. A lens axis of the FAC lens is at a non-zero angle with respect to the reference plane. The transmitter includes a transmit lens optically coupled to the FAC lens. The receiver includes a receive lens and a light detector optically coupled to the receive lens.

Other aspects, embodiments, and implementations will become apparent to those of ordinary skill in the art by reading the following detailed description, with reference where appropriate to the accompanying drawings.

DETAILED DESCRIPTION

Figure 1:
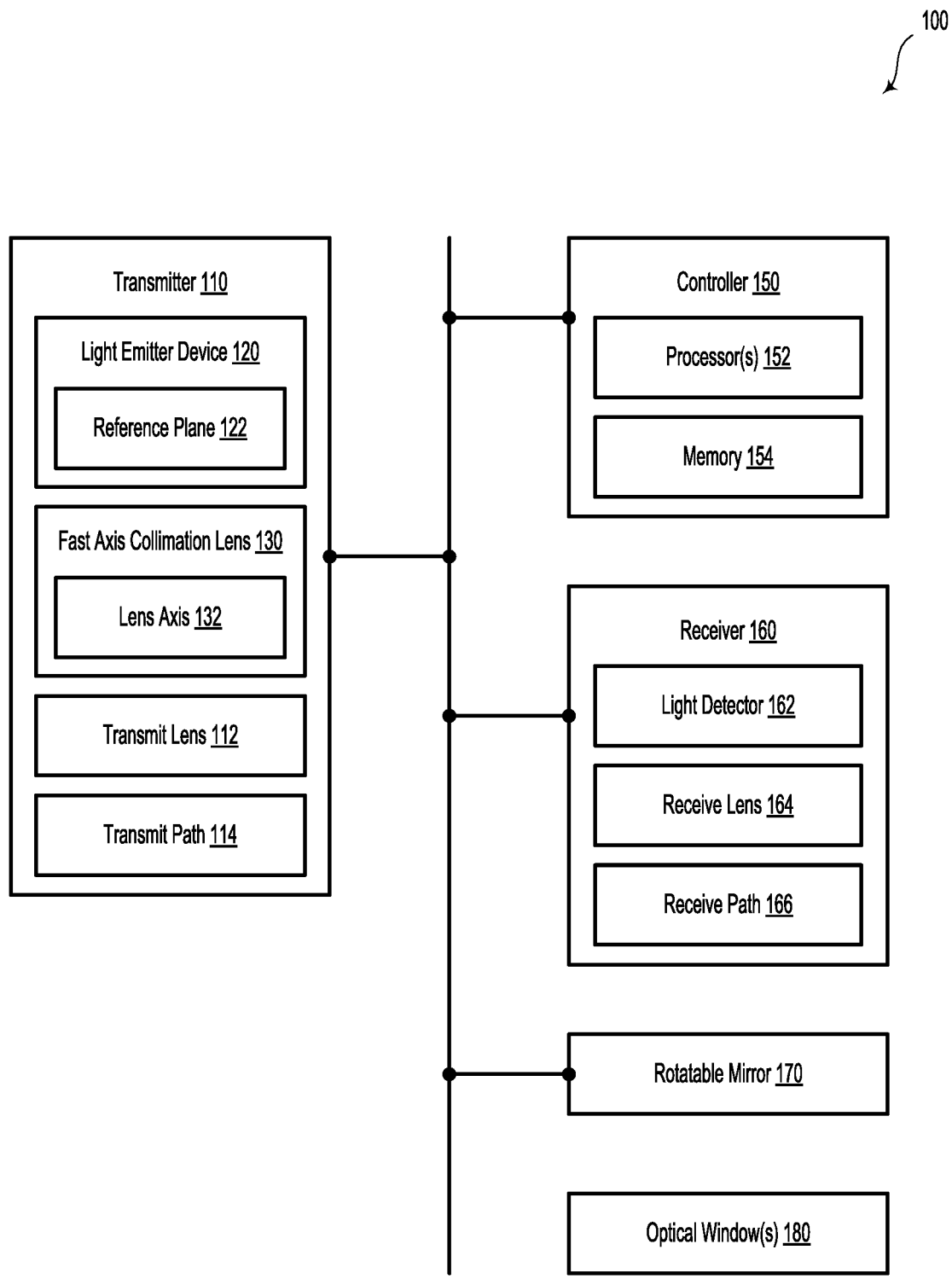
FIG. 1 illustrates an optical system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

A LIDAR device includes a light transmitter configured to transmit light into an environment of the LIDAR device via one or more optical elements in a transmit path (e.g., a transmit lens, a rotating mirror, and an optical window) and a light detector configured to detect via one or more optical elements in a receive path (e.g., the optical window, the rotating mirror, a receive lens, and a pinhole aperture) light that has been transmitted from the transmitter and reflected by an object in the environment. The light transmitter can be, for example, a laser die (e.g., made up of one or more laser diode bars) that emits light that diverges along a fast axis and a slow axis. The laser die can be optically coupled to a fast-axis collimating (FAC) lens (e.g., a cylindrical lens) that collimates the fast axis of the light emitted by the laser die to provide partially-collimated transmit light. The FAC lens can be positioned relative to the laser die so that the transmit light has desired characteristics in terms of beam size, position, direction, and divergence. For example, the transmit light should have a direction such that the light can go through the transmit path into the environment of the LIDAR device and then be reflected by an object in the environment back into the LIDAR device and received by the detector through the receive path. If the FAC lens is incorrectly positioned relative to the laser die, the resulting transmit light might not be in the proper direction to go through the transmit path, or the transmit light might go through the transmit path into the environment in a direction such that the reflected light from an object in the environment is unable to reach the detector. Additionally or alternatively, a position of the FAC lens could be modified so as to adjust focus or other characteristics (e.g., beam shape, beam diameter, etc.) of the transmit light.

In an example implementation, the transmit light from the FAC lens may be incident on a transmit lens that collimates the transmit light. If the FAC lens is properly aligned, then the transmit light beam will be centered at the transmit lens. In some embodiments, proper alignment of the FAC lens (e.g., a cylindrical lens) could include an arrangement where the FAC lens may be "out of square" with regard to the light emitter device. In other words, the FAC lens could be offset in x, y, or z position, and/or pitch/roll/elevation with respect to the light emitter device.

In an example embodiment, an orientation and/or a position of the FAC lens could be adjusted relative to the laser die. For example, the x, y, and z positions of the cylindrical axis of the FAC lens relative to the optical axis of the laser die and the yaw angle between the cylindrical axis of the FAC lens and the optical axis of the laser die could be adjusted. It is also possible to control the roll angle of the cylindrical axis about the optical axis of the laser die. Once the proper orientation and location of the FAC lens is achieved, an adhesive (e.g., curable epoxy) could be used to fix the FAC lens in place with respect to the light emitter device.

Light detectors, such as photodiodes, avalanche photodiodes (APDs), silicon photomultipliers (SiPMs), single photon avalanche diodes (SPADs), multi-pixel photon counters (MPPCs), phototransistors, cameras, active pixel sensors (APS), charge coupled devices (CCD), cryogenic detectors, and/or any other sensor of light, can be used to detect light that is imparted on their surfaces (e.g., by outputting an electrical signal, such as a voltage or a current, corresponding to an intensity of the light). Many types of such devices are fabricated using semiconducting materials, such as silicon. Light detectors can be arranged into arrays, which could be connected in parallel. These arrays, when made of light detectors constructed to operate in Geiger-mode such as SPADs, may be referred to as silicon photomultipliers (SiPMs) or multi-pixel photon counters (MPPCs).

SiPMs and other such detector arrays can be employed in a wide range of light detecting applications. For example, a light detection and ranging (LIDAR) system may include a light source that transmits light to a scene and then receives light reflected from the scene. The reflected signal may impinge on a pinhole aperture and be detected by a SiPM. The detected signal could be used to determine distances between the LIDAR and objects in the scene (e.g., based on travel time and/or reflected light intensity). Multiple measurements may be made consecutively by a LIDAR system and then arranged by the LIDAR system or a coupled computing system to generate a point cloud that represents the environment surrounding the LIDAR system.

The LIDAR systems described above may include an objective lens that focuses the reflected light from the scene onto the SiPM for detection. Various types of lenses can be used as objective lenses to focus the reflected light onto the SiPM. For example, biconvex or plano-convex lenses may be used. Further, in some embodiments, an aspherical lens and/or a series of cascaded lenses may be used as an objective instead of a single lens.

Additionally, to maximize the intensity of the reflected signal that is transmitted to and detected by the SiPM (e.g., to improve a signal-to-noise ratio), the objective lens may be shaped in such a way so that the reflected signal is distributed across the entirety of, or nearly the entirety of, the SiPM. In some embodiments, due to the received light passing through a pinhole, the shape of the receiving lens may be transmitted to the plane of the SiPM. For example, if the SiPM is rectangularly shaped, the objective lens may be shaped so as to distribute the reflected signal in a rectangular pattern across the SiPM. In other words, the objective lens may also be rectangularly shaped based on the rectangular shape of the SiPM. Such an objective lens shape may minimize the portion of the SiPM that remains unilluminated by the reflected signal. Similarly, if the SiPM is circularly shaped, the objective lens may be shaped so as to distribute the reflected signal in a circular pattern across the SiPM. Other shapes of the SiPM/distributed signal are also possible (e.g., squares, triangles, trapezoids, parallelograms, pentagons, hexagons, heptagons, octagons, nonagons, decagons, etc.). In addition to, or instead of, increasing the overall intensity detected by the SiPM, the technique of matching the illumination pattern to the SiPM shape may also more evenly distribute the intensity of the reflected signal across the light detectors within the SiPM array. Doing so may reduce the likelihood of photodetector saturation, which may thereby allow an increase in the rate at which distances may be sampled using the LIDAR system.

II. Example Optical Systems

FIG. 1 illustrates an optical system 100, according to an example embodiment. In some embodiments, the optical system 100 could be a lidar system. The optical system 100 includes a transmitter 110, which includes a light emitter device 120 configured to emit emission light (e.g., infrared light pulses). In some embodiments, the light emitter device 120 could include a laser diode bar.

The light emitter device 120 defines a reference plane 122. In some embodiments, the reference plane 122 is defined by at least one surface of the laser diode bar. The reference plane 122 could be defined by, for example, a light-emitter facet surface (e.g., a facet surface of an active layer) of a laser diode bar, among other possibilities.

The light emitter device 120 could be disposed on a substrate. In some embodiments, the substrate could include a printed circuit board, a laser die package, or another type of substrate. In an example embodiment, the substrate could be formed of a ceramic material. Additionally or alternatively, the substrate could include a glass-reinforced epoxy laminate material, such as FR-4. Other types of rigid substrate materials are possible and contemplated in the present disclosure.

The transmitter 110 includes a fast axis collimation (FAC) lens 130, which is optically coupled to the light emitter device 120. A lens axis 132 of the FAC lens 130 is at a non-zero angle with respect to the reference plane 122. The transmitter 110 also includes a transmit lens optically coupled to the FAC lens 130.

The optical system 100 includes a receiver 160. The receiver 160 includes a receive lens 164 and a light detector 162 optically coupled to the receive lens 164. In some embodiments, the light detector 162 could include at least one of: a silicon photomultiplier (SiPM) device, a single photon avalanche photodiode (SPAD), an avalanche photodiode (APD), or a multi-pixel photon counter (MPPC).

In some embodiments, the FAC lens 130 could include a cylindrical lens. In such scenarios, the lens axis 132 is defined by a cylindrical axis of the cylindrical lens. However, other optical elements (e.g., optical lenses) are contemplated and possible within the context of the present disclosure. For example, the FAC lens 130 could be an acylindrical lens. In such scenarios, the lens axis 132 could be defined by a cylindrical axis of the acylindrical lens. It will be understood that the FAC lens 130 could take other shapes or forms. Furthermore, the FAC lens 130 could include multiple optical elements.

In various embodiments, the non-zero angle could include a roll angle between zero degrees and 0.5 degrees with respect to the reference plane 122. Alternatively, the non-zero angle could include a roll angle between 0.5 degrees and 20 degrees with respect to the reference plane 122. It will be understood that other roll angle values and/or roll angle ranges or subranges are possible and contemplated. For example, the non-zero angle could include a roll angle between a lower bound angle value and an upper bound angle value. In such examples, the lower bound angle value could be between zero and 2 degrees and the upper bound angle value could between 0.5 and 20 degrees.

In example embodiments, an end facet of the laser diode bar could define a facet plane. In such scenarios, a fast axis of the FAC lens 130 is not parallel to the facet plane. In such scenarios, the fast axis of the FAC lens 130 could form a pitch angle between zero degrees and 0.5 degrees with respect to the facet plane. Alternatively, the fast axis of the FAC lens 130 could form a pitch angle between 0.5 degrees and 20 degrees with respect to the facet plane. It will be understood that other pitch angle values and/or pitch angle ranges or subranges are possible and contemplated. For example, the fast axis of the FAC lens 130 could form a pitch angle between a lower bound angle value and an upper bound angle value. In such examples, the lower bound angle value could be between zero and 2 degrees and the upper bound angle value could between 0.5 and 20 degrees.

In embodiments in which an end facet of the laser diode bar defines a facet plane, a back plane of the FAC lens 130 could be arranged along a plane that is not parallel to the facet plane. For example, the back plane of the FAC lens 130 could form a yaw angle between zero degrees and 0.5 degrees with respect to the facet plane. Alternatively, the back plane of the FAC lens 130 could form a yaw angle between 0.5 degrees and 20 degrees with respect to the facet plane.

In such scenarios, the arrangement of the FAC lens 130 with respect to the light emitter device 120 at a non-zero angle could be beneficial to center a beam profile of the emission light at the transmit lens 112 and/or align other portions of the optical system 100.

In some embodiments, the FAC lens 130 could be fixed with respect to the light emitter device 120 with at least one of: an adhesive (e.g., a thermoset polymer), a curable epoxy, a fastener, or a clamp.

In example embodiments, the light detector 162 could include a light detection area (e.g., an active region or photosensitive area) having a light detection area shape. In such scenarios, the receive lens 164 could be shaped so as to correspond to the light detection area shape. For example, the light detection area shape could be square or rectangular, and, in such scenarios, the shape of the receive lens 164 could be square or rectangular so as to correspond with the light detection area shape. In some embodiments, the receive lens 164 could have the same shape as the light detection area, but could be scaled larger than one or more extents of the light detection area so as to collect, focus, and/or collimate light from over a larger area. It will be understood that the receive lens 164 could be shaped according to other shapes.

In example embodiments, the optical system 100 could include a rotatable mirror 170. In such scenarios, the light emitted along from the light emitter device 120 could interact with the rotatable mirror 170 so as to be reflected toward an environment of the optical system 100. In some embodiments, the optical system 100 could additionally or alternatively include one or more optical windows 180. The light reflected toward the environment of the optical system 100 is transmitted by way of the optical windows 180. The rotatable mirror 170 and optical windows 180 are further described in relation to FIG. 4.

In some examples, the optical system 100 also includes a controller 150. The controller 150 includes at least one of a field-programmable gate array (FPGA) or an application-specific integrated circuit (ASIC). Additionally or alternatively, the controller 150 may include one or more processors 152 and a memory 154. The one or more processors 152 may include a general-purpose processor or a special-purpose processor (e.g., digital signal processors, etc.). The one or more processors 152 may be configured to execute computer-readable program instructions that are stored in the memory 154. As such, the one or more processors 152 may execute the program instructions to provide at least some of the functionality and operations described herein.

The memory 154 may include or take the form of one or more computer-readable storage media that may be read or accessed by the one or more processors 152. The one or more computer-readable storage media can include volatile and/or non-volatile storage components, such as optical, magnetic, organic or other memory or disc storage, which may be integrated in whole or in part with at least one of the one or more processors 152. In some embodiments, the memory 154 may be implemented using a single physical device (e.g., one optical, magnetic, organic or other memory or disc storage unit), while in other embodiments, the memory 154 can be implemented using two or more physical devices.

As noted, the memory 154 may include computer-readable program instructions that relate to operations of optical system 100. As such, the memory 154 may include program instructions to perform or facilitate some or all of the functionality described herein. The controller 150 is configured to carry out operations. In some embodiments, controller 150 may carry out the operations by way of the processor 152 executing instructions stored in the memory 154.

The operations could include operating various elements of optical system 100 to obtain range information about an environment of the optical system 100. The controller 150 could be configured to carry out other operations as well.

FIGS. 2A, 2B, 2C, 2D, 2D, 2E, 2F, 2G, 2H, 2I, and 2J illustrate various portions and views of a transmitter, according to example embodiments. The transmitter could include transmitter 110, as illustrated and described in reference to FIG. 1.

Figure 2A:
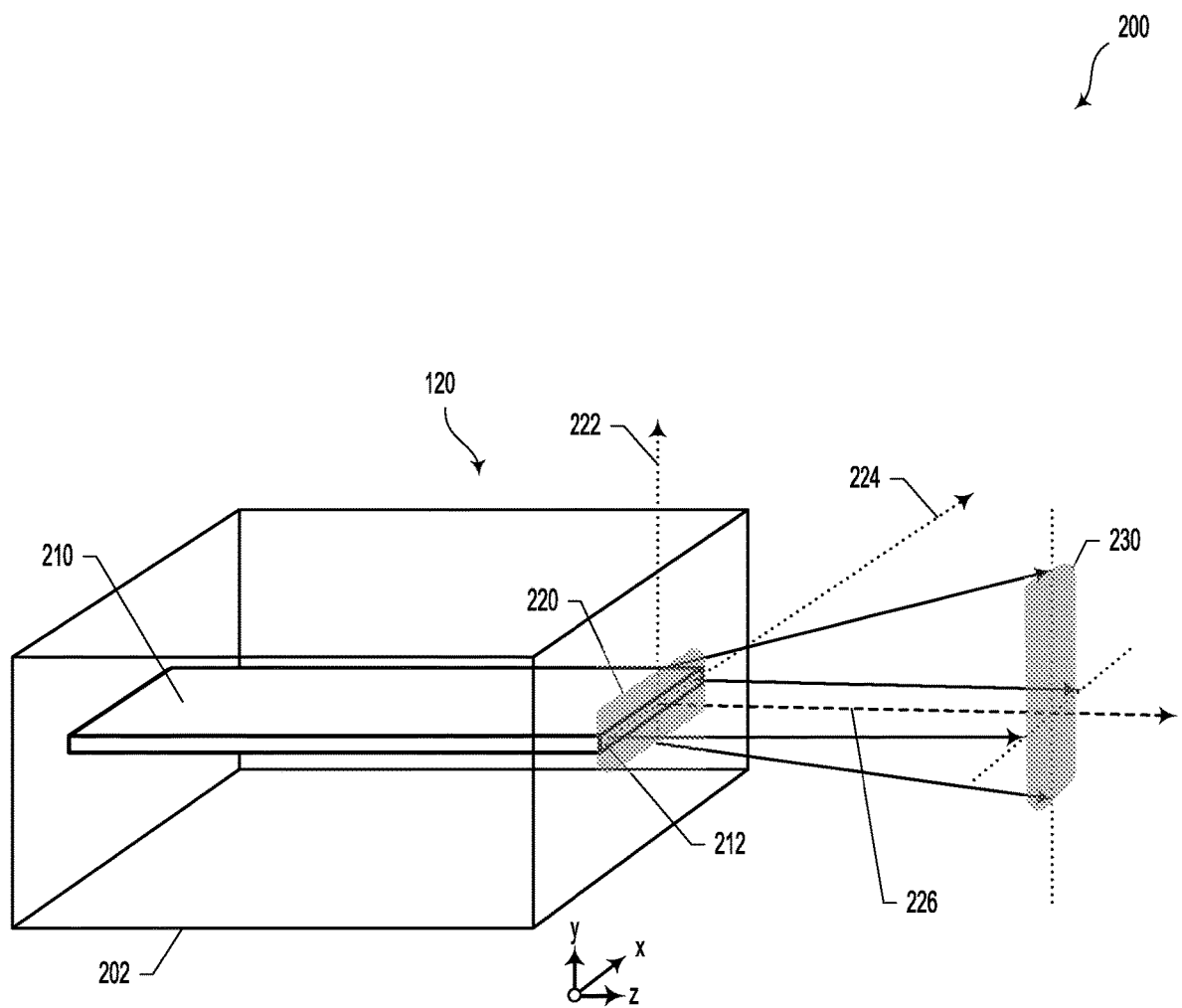
FIG. 2A illustrates a portion of a transmitter, according to an example embodiment.

FIG. 2A illustrates a portion 200 of a transmitter, according to an example embodiment. As an example, the portion 200 of the transmitter could include light emitter device 120, as illustrated and described in reference to FIG. 1. As illustrated in FIG. 2A, the light emitter device 120 could include a laser die 210. The laser die 210 could be disposed on or within a substrate 202. The laser die 210 could be a laser diode that is configured to emit infrared light in response to injection current applied by, for example, a firing circuit. The laser die 210 could be configured to emit light along a transmit path 226. The transmit path 226 could include, for example, a principal emission axis of the laser die 210. In some embodiments, the transmit path could be defined, at least in part, as being along an axis and/or parallel to a vector that extends substantially perpendicular from an output facet 212 (e.g., an emission facet) of a laser bar of the laser die 210.

In some embodiments, the laser die 210 may emit light that initially has a beam waist 220 with a rectangular-shaped cross-section (e.g., ~1 micron high and as wide as the laser die 210). In some examples, the beam shape may change (e.g., diverge) as light proceeds away from the laser die 210. For example, the emitted light may diverge faster along a fast axis 222 of the laser die 210 in comparison to a slow axis 224. Accordingly, in some embodiments, a far-field beam shape 230 could include an oval-shaped or rectangular-shaped cross-section that is wider along a direction parallel to the fast axis 222 than along a direction parallel to the slow axis.

Figure 2B:
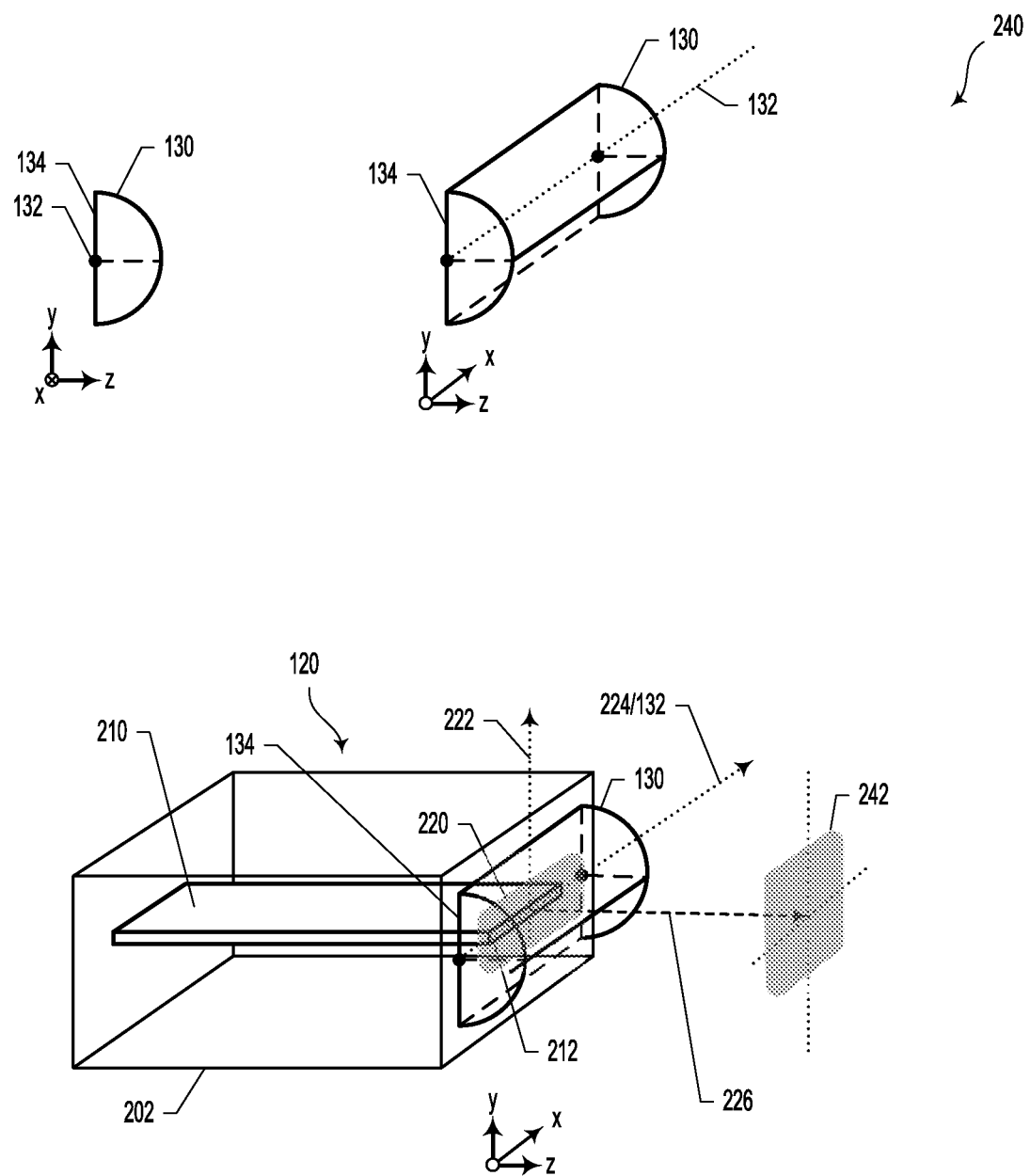
FIG. 2B illustrates several portions of a transmitter, according to an example embodiment.

FIG. 2B illustrates several portions of a transmitter 240, according to an example embodiment. As illustrated in cross-sectional and oblique views, a FAC lens 130 could be shaped like a half-cylinder having a cylindrical lens axis 132. It will be understood that the FAC lens 130 could have different shapes and/or lens axes as well.

In some embodiments, the FAC lens 130 could be optically coupled to output facet 212 of the laser die 210. For example, a back facet 134 of the FAC lens 130 could be physically abutted to the output facet 212. In such scenarios, the lens axis 132 could be substantially aligned with, or parallel to, the slow axis 224. Other ways to attach, and/or optically couple the FAC lens 130 to the light emitter device 120 are contemplated and possible.

In scenarios with a FAC lens 130, light emitted by the light emitter device 120 may include a modified far-field beam shape 242 that could have a more square cross-section as compared to the uncorrected far-field beam shape 230 of FIG. 2A. For example, the modified far-field beam shape 242 could have a cross-section that includes a smaller diameter, smaller area, and/or smaller circumference. In such a fashion, the far-field light beam can maintain a tighter beam spot and beam profile, which may provide better long-range sensing performance of the optical system 100.

In some example embodiments, a cross-sectional profile of light emitted from the output facet 212 could include one or more wide rectangular shapes (e.g., corresponding to one or more laser bars 210) with respective long sides that may be parallel to the x-axis. As the light emitted from the output facet 212 proceeds generally along the +z direction, the emission light profile may diverge quickly in the y direction, and may diverge more slowly in the x direction, such that the emission light profile could be roughly square when it interacts with the FAC lens 130. After interacting with the FAC lens 130, the emission light profile diverges much less quickly in the y direction. However, in some embodiments, the emission light may continue to diverge in the x direction. Accordingly, a far field (after the FAC lens 130) emission profile could include a rectangle elongated along the x direction again. After interacting with the transmit lens 112, the beam profile continues to diverge to a more square cross section that could substantially match the beam shape at the output surface of the FAC lens 130. In some example embodiments, the FAC lens 130 could be imaged to infinity by transmit lens 112.

Accordingly, in such scenarios, the FAC lens 130 could be configured to reduce or eliminate the y divergence of the beam emitted by the laser bar 210. Such a configuration could allow the beam at transmit lens 112 to be smaller (in x and/or y extent) and could also provide that the beam at the transmit lens 112 could have a lower angular divergence. In some embodiments, such an approach may reduce the need for a small f-number lens and/or relax other optical design constraints within the optical system 100.

Figure 2C:
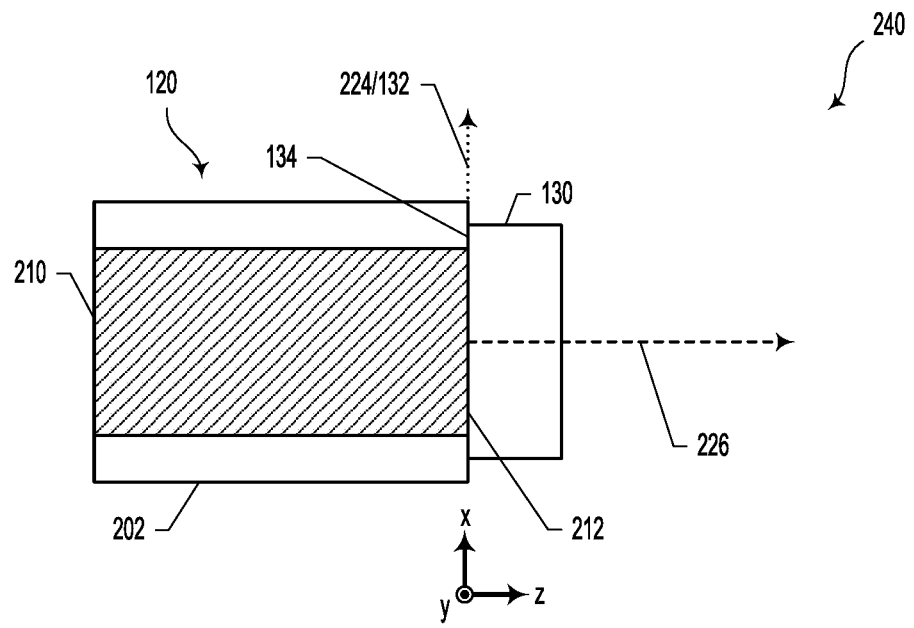
FIG. 2C illustrates a top view of a transmitter, according to an example embodiment.

FIG. 2C illustrates a top view of the transmitter 240, according to an example embodiment. As illustrated, the transmitter 240 could include a FAC lens 130 with a back facet 134 that is substantially abutted to the output facet 212. Furthermore, the lens axis 132 of the FAC lens 130 could substantially correspond to (e.g., overlap with) the slow axis 224 of the light emitter device 120.

Figure 2D:
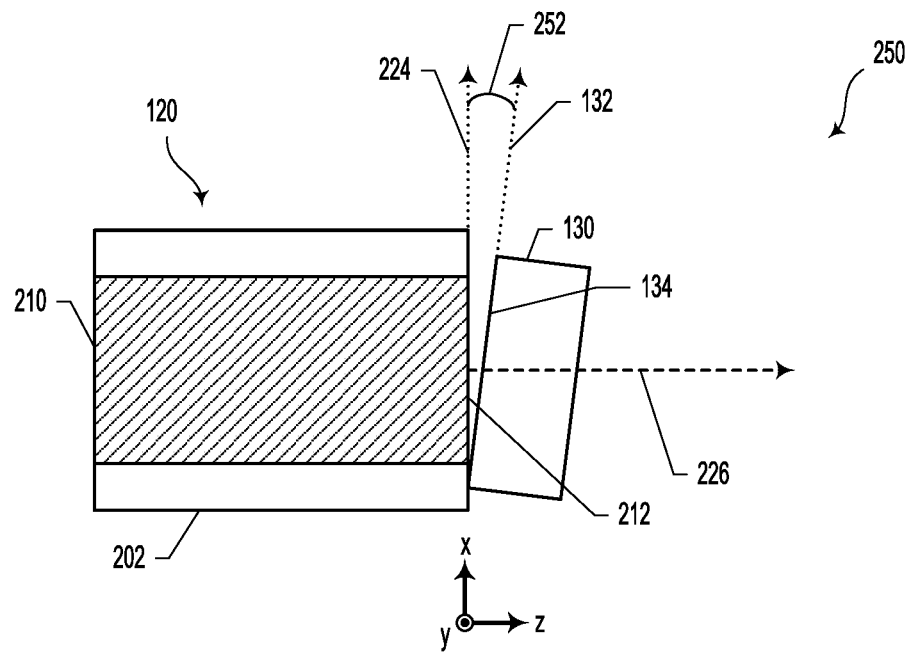
FIG. 2D illustrates a top view of a transmitter, according to an example embodiment.

FIG. 2D illustrates a top view of a transmitter 250, according to an example embodiment. Transmitter 250 could include a FAC lens 130 that is disposed in a different relative position (e.g., along a yaw axis) as compared to the scenario illustrated in FIG. 2C. For example, the FAC lens 130 could be rotated about the y-axis such that a non-zero yaw angle 252 is provided between the slow axis 224 and the lens axis 132. In some embodiments, the non-zero yaw angle 252 could be between zero degrees and 0.5 degrees. In other embodiments, the non-zero yaw angle 252 could be between 0.5 degrees and 20 degrees. Other angles are contemplated and possible within the context of this disclosure. By adjusting the rotation of the FAC lens 130 about the y-axis (e.g., rotating the FAC lens 130 in azimuth/yaw), certain aspects of the far-field beam pattern can be adjusted and/or corrected. For example, by maintaining a non-zero yaw angle 252, the transmitter 250 may be able to adjust a far-field beam position of the beam and/or provide a narrower and/or a more circular beam profile than that provided by transmitter 240 under similar circumstances. Additionally or alternatively, the non-zero yaw angle 252 could adjust a far-field beam position for beam alignment and/or beam pointing purposes.

Figure 2E:
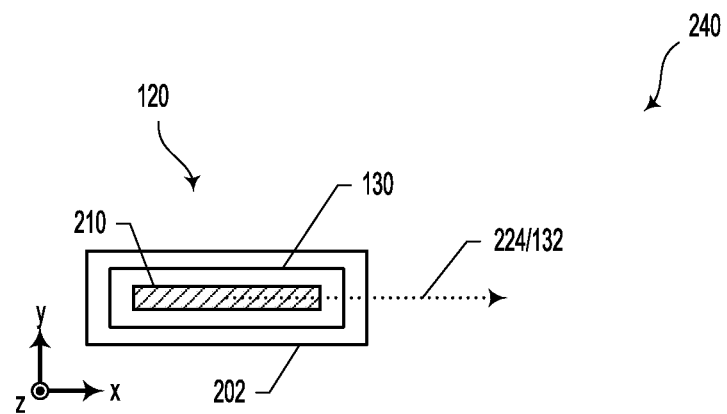
FIG. 2E illustrates a front view of a transmitter, according to an example embodiment.

FIG. 2E illustrates a front view of the transmitter 240, according to an example embodiment. As illustrated, the transmitter 240 could include the lens axis 132 of the FAC lens 130 as being substantially aligned with the slow axis 224 of the laser die 210.

Figure 2F:
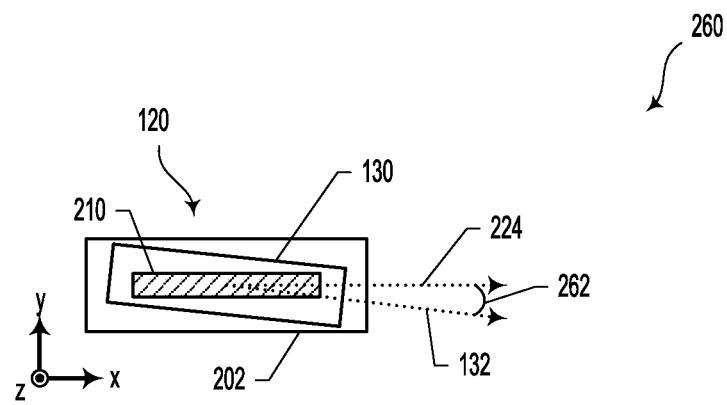
FIG. 2F illustrates a front view of a transmitter, according to an example embodiment.

FIG. 2F illustrates a front view of a transmitter 260, according to an example embodiment. Transmitter 260 could include a FAC lens 130 that is disposed in a different relative position (e.g., along a roll axis) as compared to the scenario illustrated in FIG. 2E. For example, the FAC lens 130 could be rotated about the z-axis such that a non-zero roll angle 262 is provided between the slow axis 224 and the lens axis 132. For example, the non-zero roll angle 262 could be provided along the x-y plane. In some embodiments, the non-zero roll angle 262 could be between zero degrees and 0.5 degrees. In other embodiments, the non-zero roll angle 262 could be between 0.5 degrees and 20 degrees. Other angles are contemplated and possible within the context of this disclosure. By adjusting the rotation of the FAC lens 130 about the z-axis (e.g., rotating the FAC lens 130 in roll), certain aspects of the far-field beam pattern can be adjusted and/or corrected. For example, by maintaining a non-zero roll angle 262, the transmitter 260 may be able to defocus the beam and/or provide a narrower and/or a more circular beam profile than that provided by transmitter 240 under similar circumstances. Additionally or alternatively, the non-zero roll angle 262 could adjust a far-field beam position for beam alignment and/or beam pointing purposes. In scenarios with multiple emitters on a single laser die, adjusting the roll angle could adjust the angular offset in addition to changing focus on a per-beam basis.

Figure 2G:
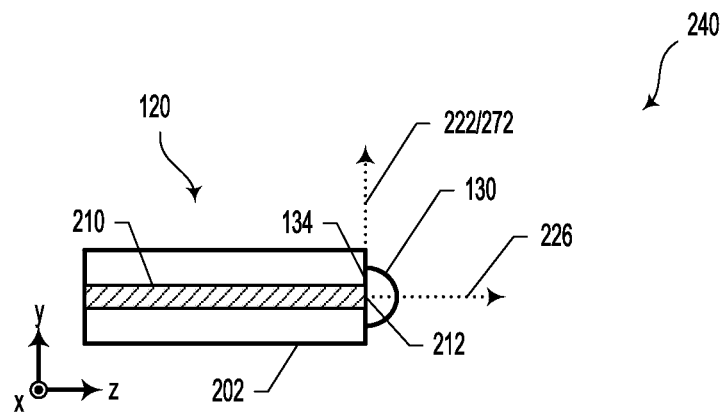
FIG. 2G illustrates a side view of a transmitter, according to an example embodiment.

FIG. 2G illustrates a side view of the transmitter 240, according to an example embodiment. As illustrated, the transmitter 240 could include the back facet 134 (and corresponding back facet plane 272) of the FAC lens 130 as being substantially parallel to the fast axis 222 of the laser die 210.

Figure 2H:
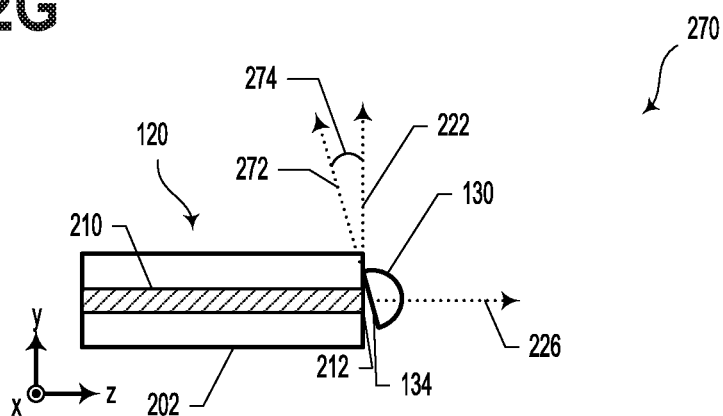
FIG. 2H illustrates a side view of a transmitter, according to an example embodiment.

FIG. 2H illustrates a side view of a transmitter 270, according to an example embodiment. Transmitter 270 could include a FAC lens 130 that is disposed in a different relative position (e.g., along a pitch axis) as compared to the scenario illustrated in FIG. 2G. For example, the FAC lens 130 could be rotated about the x-axis such that a non-zero pitch angle 274 is provided between the fast axis 222 of the light emitter device 120 and the back facet plane 272. For example, the non-zero pitch angle 274 could be provided along the y-z plane. In some embodiments, the non-zero pitch angle 274 could be between zero degrees and 0.5 degrees. In other embodiments, the non-zero pitch angle 274 could be between 0.5 degrees and 20 degrees. Other angles are contemplated and possible within the context of this disclosure. By adjusting the rotation of the FAC lens 130 about the x-axis (e.g., rotating the FAC lens 130 in pitch), certain aspects of the far-field beam pattern can be adjusted and/or corrected. For example, by maintaining a non-zero pitch angle 274, the transmitter 270 may be able to provide a narrower and/or a more circular beam profile than that provided by transmitter 240 under similar circumstances. Additionally or alternatively, the non-zero pitch angle 274 could adjust a far-field beam position for beam alignment and/or beam pointing purposes.

Figure 2I:
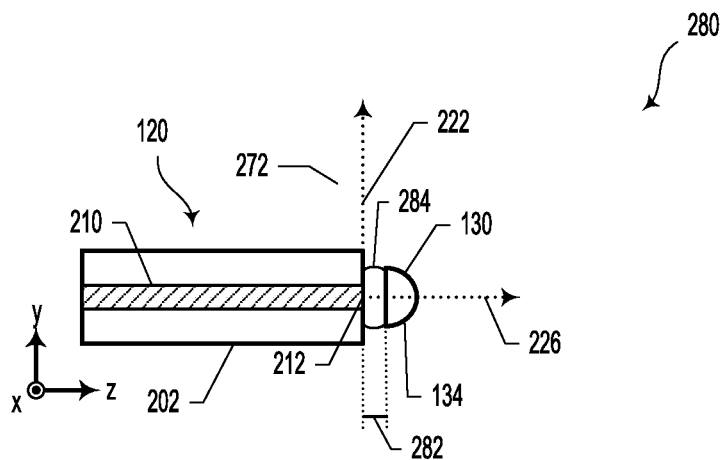
FIG. 2I illustrates a side view of a transmitter, according to an example embodiment.

FIG. 2I illustrates a side view of a transmitter 280, according to an example embodiment. Transmitter 280 could include a FAC lens 130 that is disposed in a different relative position (e.g., along a z-axis) as compared to the scenario illustrated in FIG. 2G. In such a scenario, the FAC lens 130 could be disposed at an offset distance 282 along the z-axis with respect to a laser bar facet surface 212. For example, the FAC lens 130 could be disposed 100 microns away from the laser bar facet surface 212. By adjusting a z-axis position of the FAC lens 130 with respect to the laser bar facet surface 212, various characteristics of the transmitted beam could be adjusted and/or controlled. For example, adjusting the z-axis position of the FAC lens 130 could adjust a focus position and/or collimation of the transmit beam.

In some embodiments, adjusting the focus position of the transmit beam may be helpful to increase the transmitted beam size at the transmit lens 112, which can make it less prone to disruption by rain droplets or other types of occlusions. Additionally or alternatively, the transmit beam focus could be adjusted so as to conform to local, state, federal, and/or international laser safety standards. In some embodiments, these aspects may be performed by the FAC lens 130 itself. For example, the FAC lens 130 could be engineered to incorporate surface ripples, surface waves, or other types of optical adjustments so as to adjust the transmitted beam size apparent at the transmit lens 112. Other ways to adjust the FAC lens 130, such as incorporating an optical diffuser and a focusing lens, and their corresponding functionalities, are contemplated and possible within the scope of the present disclosure.

In any of the embodiments described herein that involve a FAC lens, the space between the FAC lens 130 and the laser bar facet surface 212 could be at least partially filled with an optical material 284. The optical material 284 could include an adhesive (e.g., a curable epoxy) and/or an index-matching material. In alternative embodiments, the space between the FAC lens 130 and the laser bar facet surface 212 could at least be partially filled with air, nitrogen, or evacuated.

Figure 2J:
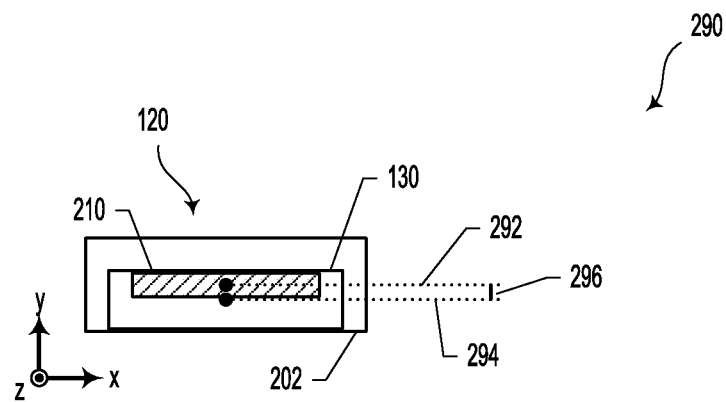
FIG. 2J illustrates a side view of a transmitter, according to an example embodiment.

FIG. 2J illustrates a front view of a transmitter 290, according to an example embodiment. Transmitter 290 could include a FAC lens 130 that is disposed in a different relative position along the x-y plane as compared to the scenario illustrated in FIG. 2E. For example, the FAC lens 130 could be offset along the y-axis such that an offset 296 is provided. For example, an axis 294 of the FAC lens 130 could be offset with respect to an axis 292 of the laser die 210. In some embodiments, offset could be approximately 50 microns along the x-axis and/or y-axis. In such scenarios, by maintaining an offset 296, the transmitter 260 may be able to adjust a vertical (y-axis) beam angle/position compared to that provided by transmitter 240 under similar circumstances. Additionally or alternatively, the offset 296 could adjust a far-field beam position for beam alignment and/or beam pointing purposes.

Figure 3A:
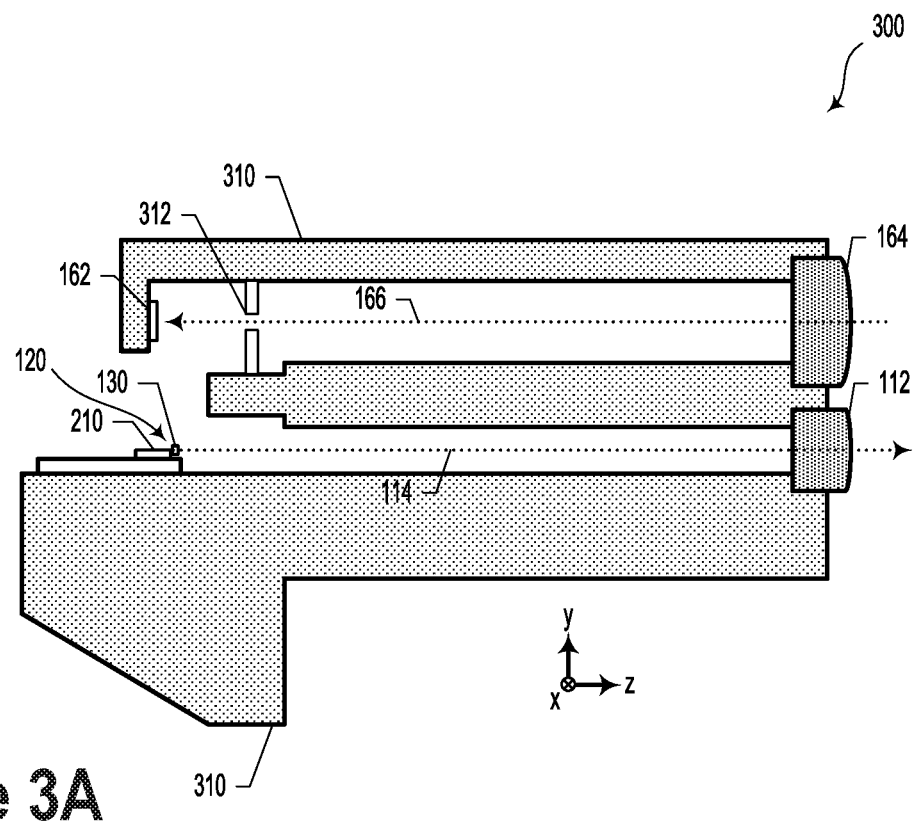
FIG. 3A illustrates a side view of a transceiver, according to an example embodiment.
Figure 3B:
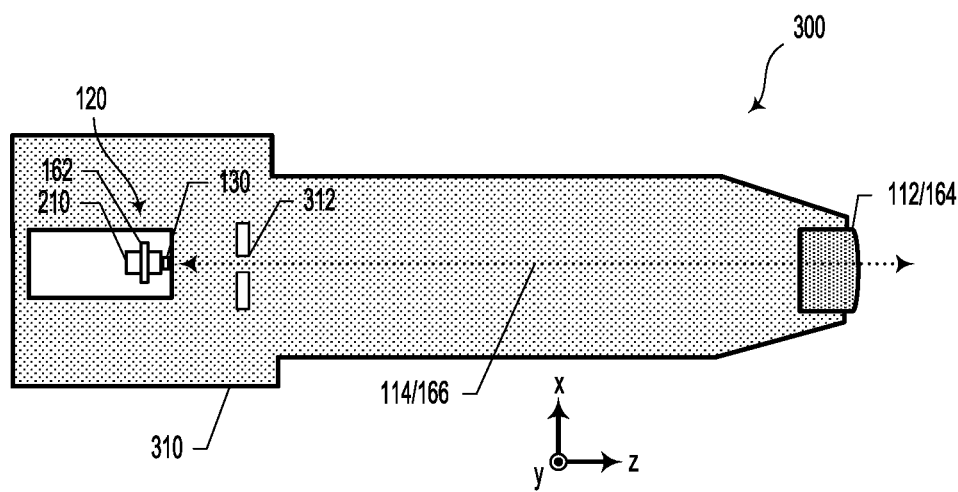
FIG. 3B illustrates a top view of a transceiver, according to an example embodiment.
Figure 3C:
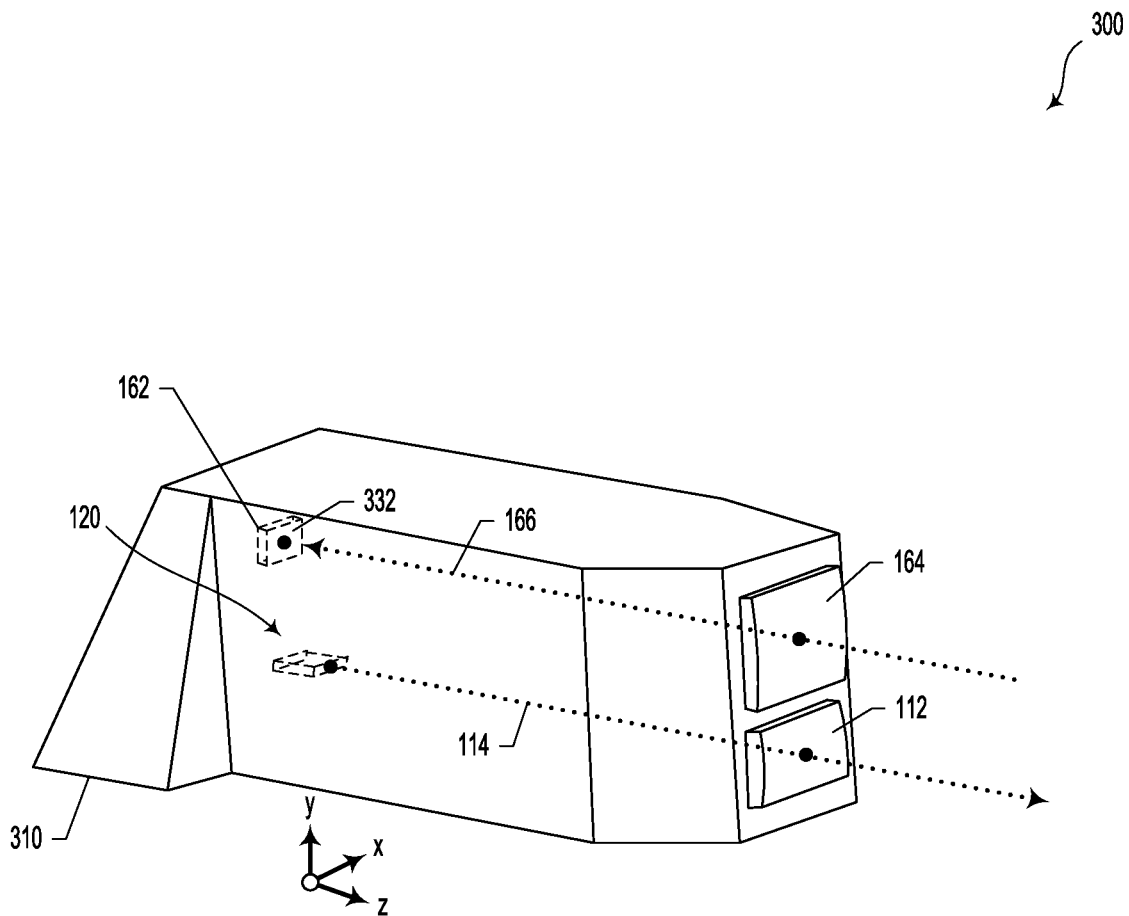
FIG. 3C illustrates an oblique view of a transceiver, according to an example embodiment.

FIGS. 3A, 3B, and 3C illustrate side, top, and oblique views, respectively, of a transceiver 300, according to example embodiments. The transceiver 300 could include elements similar or identical to transmitter 110 and receiver 160 as illustrated and described in relation to FIG. 1. For example, transceiver 300 could include a light emitter device 120, which could be mounted to a transceiver body 310. The light emitter device 120 could include a laser die 210 and a FAC lens 130. The transceiver 300 also includes a receiver (e.g., receiver 160) and a light detector 162. The light detector 162 could be mounted to the transceiver body 310. The receive optical path 166 could include a pinhole aperture 312, which could be configured to form a beam spot on the detector 162 that corresponds to a shape of the receive lens 164.

In reference to FIG. 3C, a light detection area 332 of the light detector 162 could have a particular shape (e.g., rectangle, square, circle, octagon, etc.). Additionally or alternatively, the light detection area 332 could have a particular size. For example, the light detector 162 could include a single element detector, which could be, for example 30 μm by 50 μm. Alternatively, light detector 162 could include a photodetector array, which could include a shaped array of a plurality of discrete light detectors. Such a photodetector array could have a light detection area 332 of, for example, 1.3 mm by 1.3 mm, which could include a plurality of 25×25 μm SiPM detector cells. Alternatively, in some embodiments, a single element photodetector could have a light detection area 332 of 500×500 µm. Other light detection area dimensions are possible and contemplated herein.

In some embodiments, a size and/or shape of the receive lens 164 could be based on the light detection area 332 and its respective size and/or shape. For example, for a rectangularly-shaped light detection area 332 with a side length aspect ratio of 3:2, the receive plens 164 could be shaped with a similar rectangular shape and 3:2 side length aspect ratio. In such scenario, the receive lens 164 could be scaled up in size so as to, for example, collect more light from the environment. As an example, the receive lens 164 could be rectangularly shaped and have side lengths of approximately 15 mm×10 mm. It will be understood that the receive lens 164 could be shaped based on other shapes of the light detection area 332.

Figure 3D:
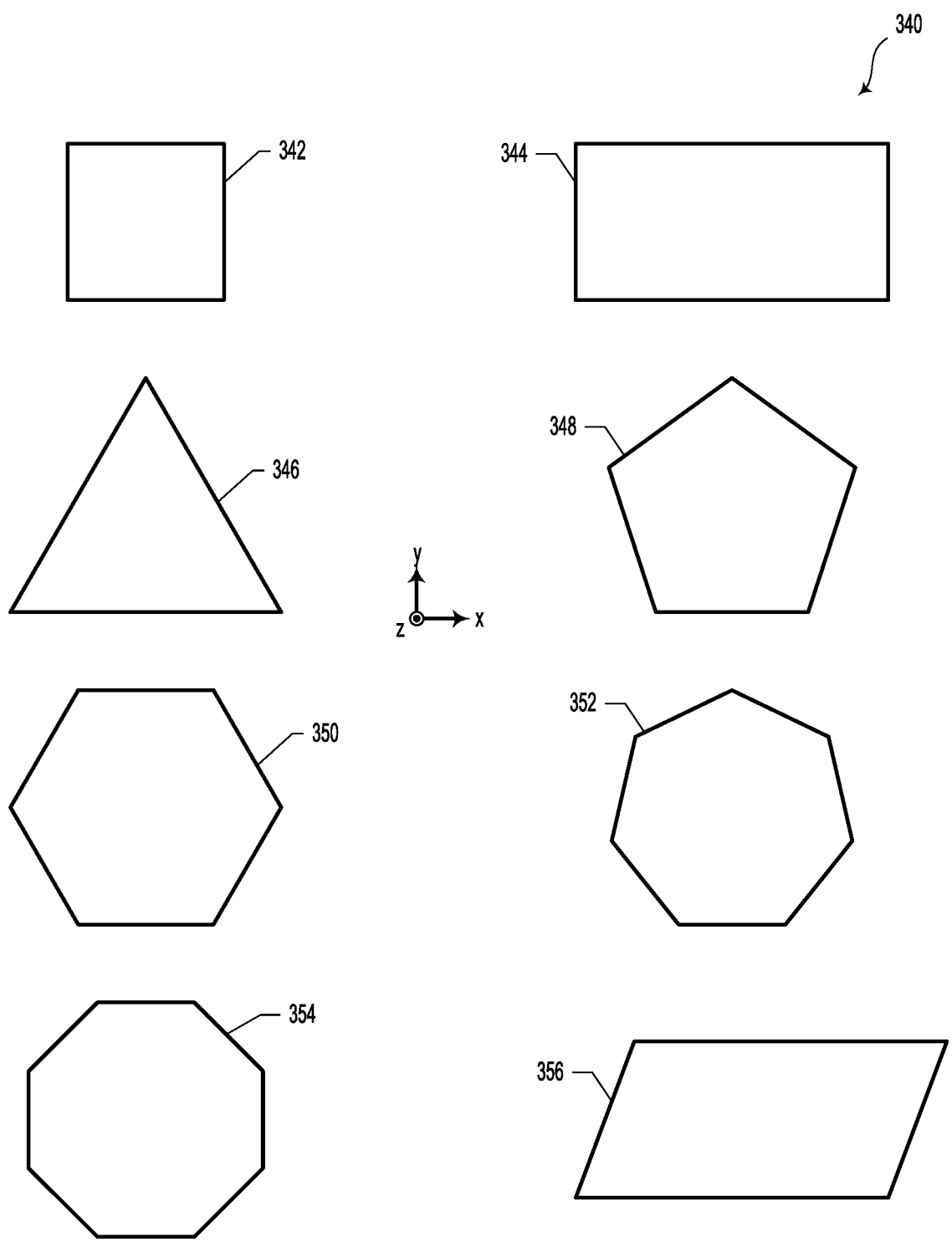
FIG. 3D illustrates various lens shapes, according to an example embodiment.

FIG. 3D illustrates various lens shapes 340, according to an example embodiment. The various lens shapes 340 could represent, for example, cross-sectional areas, and their respective shapes, of the receive lens 164. As examples, the various lens shapes 340 could include, without limitation, a square 342, a rectangle, 344, a triangle 346, a pentagon 348, a hexagon 350, a heptagon 352, an octagon 354, and/or a parallelogram 356. Other non-traditional and/or irregular lens shapes are possible and contemplated. It will be understood that the various lens shapes 340 of the receive lens 164 could be based on the shape, size, or other optical aspects of the light detection area 332. In such scenarios, the various lens shapes 340 could be selected so as to optimally (e.g., most efficiently) fill the light detection area 332 with light. For example, the various lens shapes 340 could be selected so as to minimize overfilling of the light detection area 332. In some embodiments, the relative sizes of the light detection area 332 and the receive lens 164 could be related based on the focal length of the receive lens 164 and relative pinhole size. For example, the projected light spot on the detector 162 will be the convolution of the pinhole shape and the shape of the receive lens 164 scaled by the pinhole-to-detector distance divided by the focal length of the receive lens 164. In such scenarios, the approximate size of the projected light spot may be pinhole size+receive aperture size×pinhole-to-detector distance/focal length.

Figure 4:
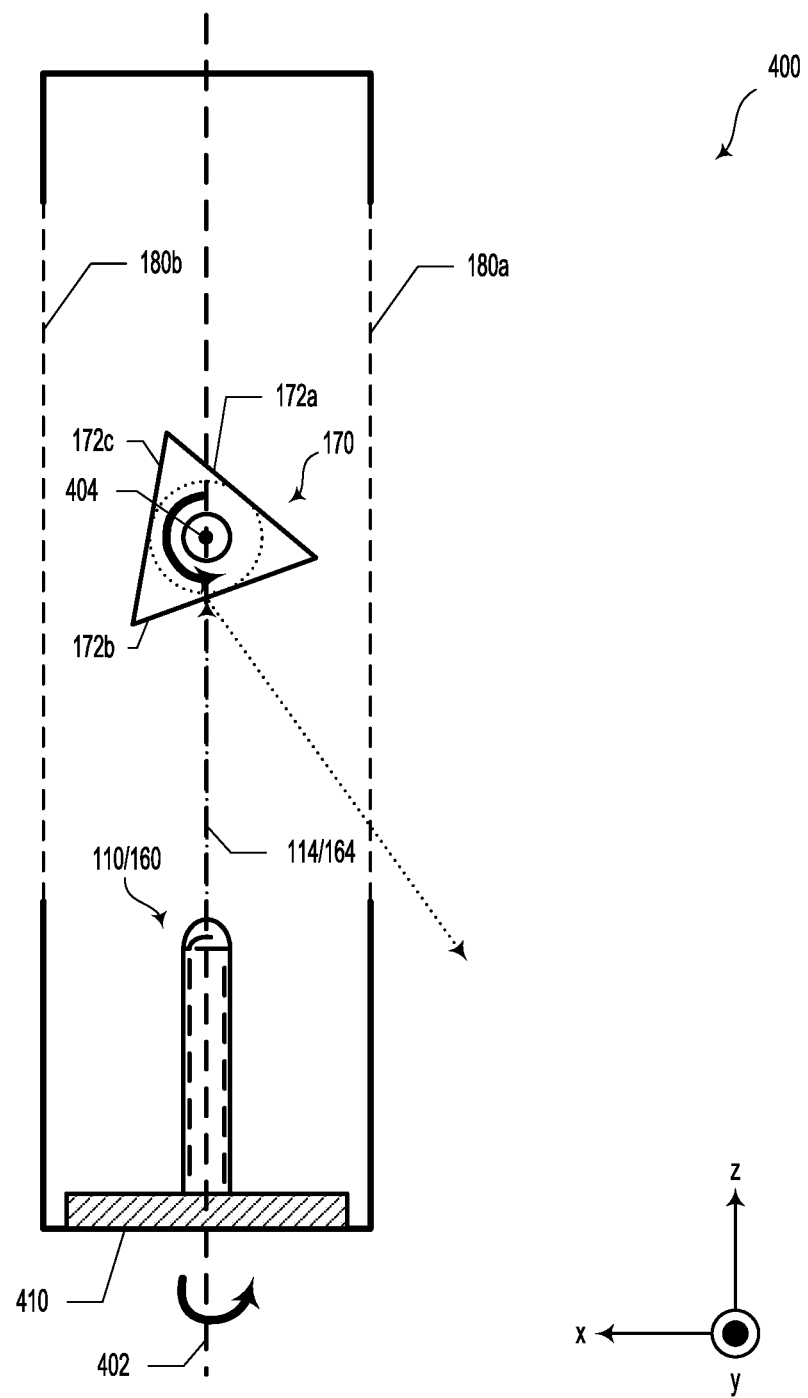
FIG. 4 illustrates an optical system, according to an example embodiment.
Figure 5A:
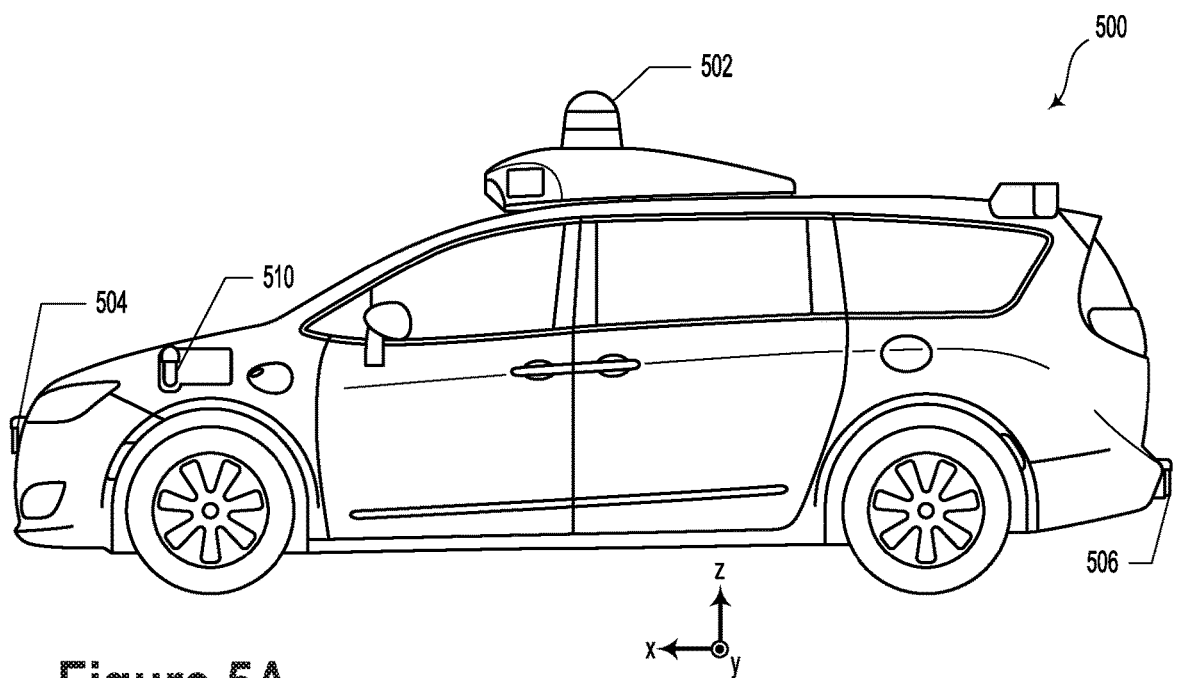
FIG. 5A illustrates a vehicle, according to an example embodiment.
Figure 5B:
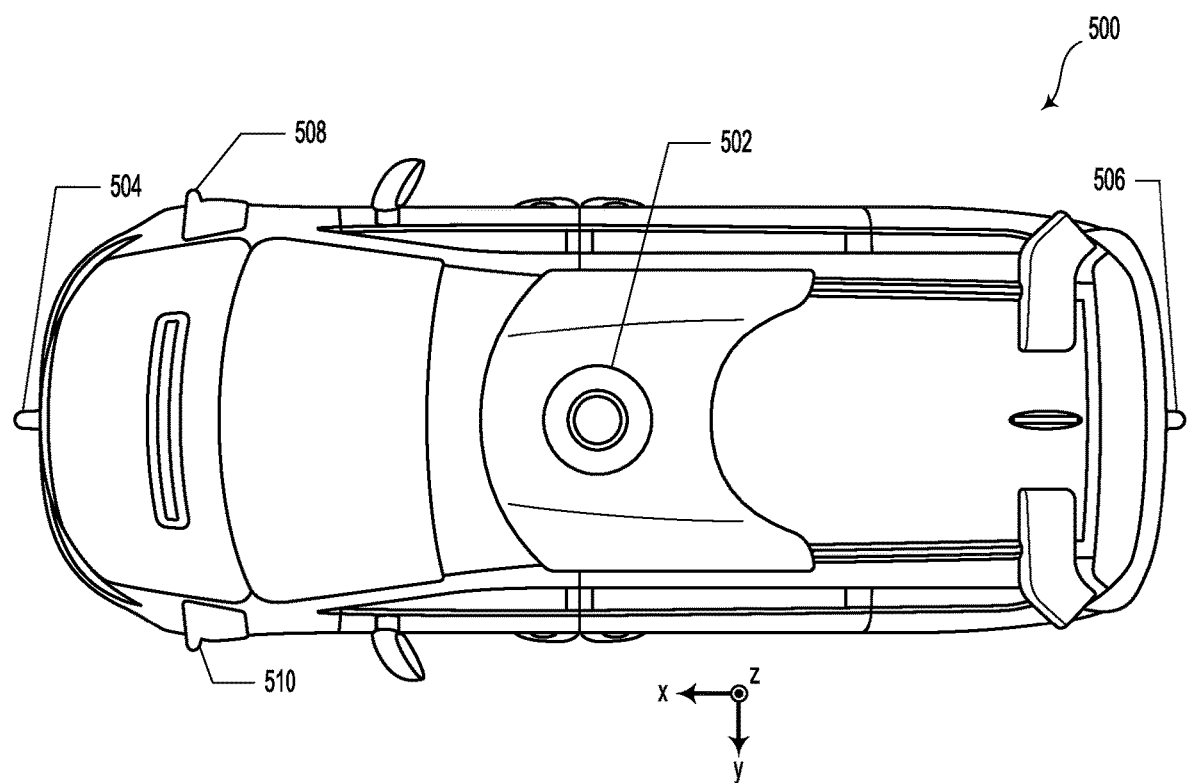
FIG. 5B illustrates a vehicle, according to an example embodiment.
Figure 5C:
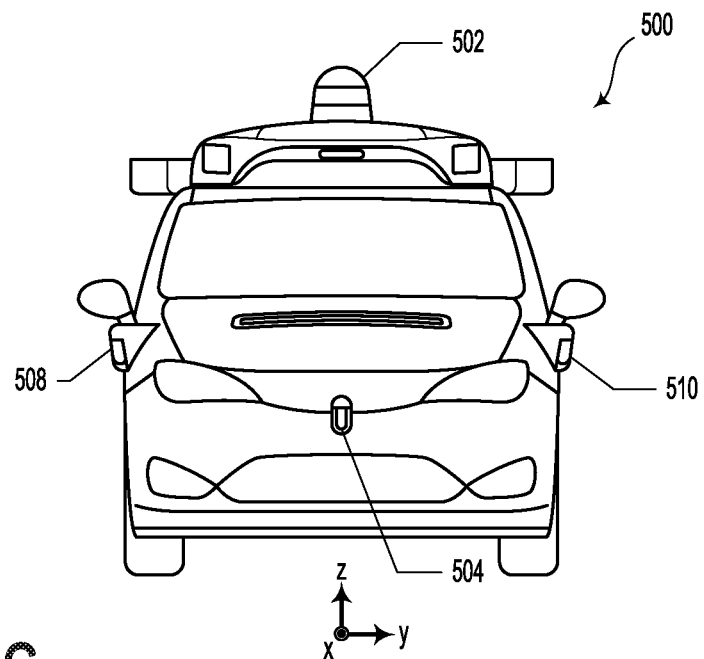
FIG. 5C illustrates a vehicle, according to an example embodiment.
Figure 5D:
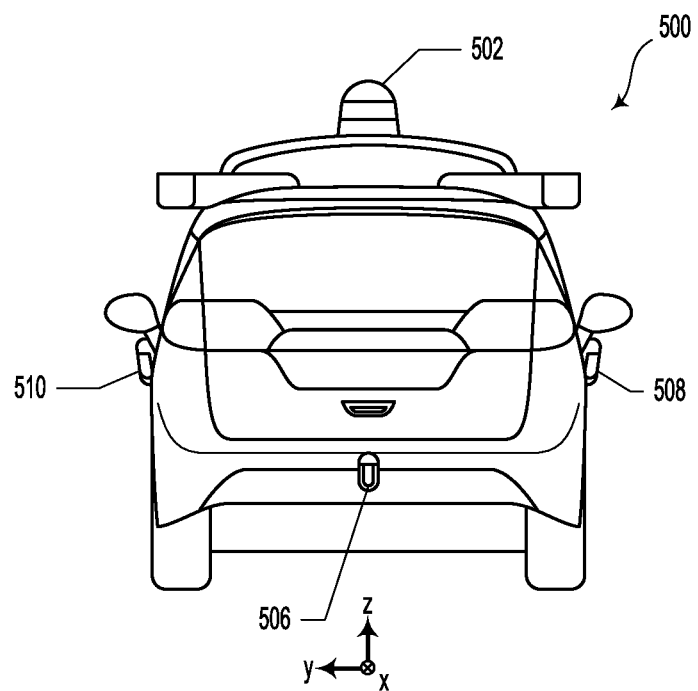
FIG. 5D illustrates a vehicle, according to an example embodiment.
Figure 5E:
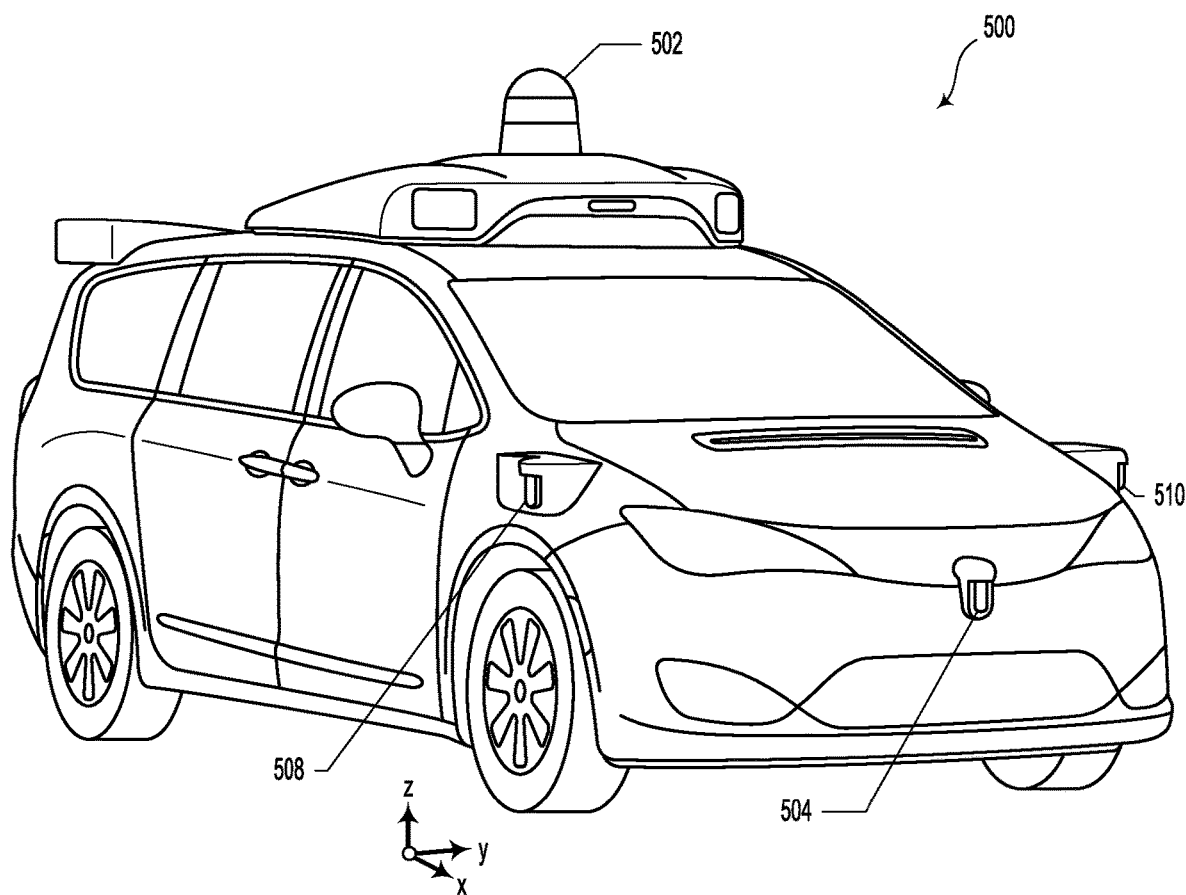
FIG. 5E illustrates a vehicle, according to an example embodiment.

FIG. 4 illustrates an optical system 400, according to an example embodiment. The optical system 400 could be similar to optical system 100 as illustrated and described in reference to FIG. 1. For example, optical system 400 could include transmitter 110 and receiver 160, which could be mounted to a rotatable stage 410. The rotatable stage 410 could be configured to rotate about an axis of rotation 402. In some embodiments, the rotatable stage 410 could be actuated by a stepper motor or another device configured to mechanically rotate the rotatable stage 410.

In some embodiments, the optical system 400 could include a rotatable mirror 170. The rotatable mirror 170 could be shaped like a triangular prism and could be configured to rotate about a mirror axis 404. The rotatable mirror 170 could include a plurality of reflective surfaces 172a, 172b, and 172c. It will be understood that the rotatable mirror 170 could have another shape (e.g., square solid, rectangular solid, pentagonal solid, hexagonal solid, etc.). All such other shapes are contemplated and possible within the scope of the present disclosure.

Additionally or alternatively, the optical system 400 could include optical windows 180a and 180b. The reflective surfaces 172a-c could be configured to reflect light pulses emitted by the optical system 100 along transmit path 114. For example, the light pulses could be reflected toward an environment of the optical system 400 by way of the optical windows 180a and 180b. Furthermore, reflected light pulses from the environment could be reflected from the reflective surfaces 172a-c along receive path 166.

In such a fashion, optical system 400 could be configured to emit light pulses into, and receive reflected light pulses from, a 360-degree region of the environment (e.g., about the z-axis). Accordingly, the optical system 400 could be configured to determine range information based on the time-of-flight of the respective reflected light pulses.

III. Example Vehicles

FIGS. 5A, 5B, 5C, 5D, and 5E illustrate a vehicle 500, according to an example embodiment. The vehicle 500 could be a semi- or fully-autonomous vehicle. While FIGS. 5A-5E illustrates vehicle 500 as being an automobile (e.g., a passenger van), it will be understood that vehicle 500 could include another type of autonomous vehicle, robot, or drone that can navigate within its environment using sensors and other information about its environment.

The vehicle 500 may include one or more sensor systems 502, 504, 506, 508, and 510. In some embodiments, sensor systems 502, 504, 506, 508, and 510 could include LIDAR sensors having a plurality of light-emitter devices arranged over a range of angles with respect to a given plane (e.g., the x-y plane).

One or more of the sensor systems 502, 504, 506, 508, and 510 may be configured to rotate about an axis (e.g., the z-axis) perpendicular to the given plane so as to illuminate an environment around the vehicle 500 with light pulses. Based on detecting various aspects of reflected light pulses (e.g., the elapsed time of flight, polarization, intensity, etc.), information about the environment may be determined.

In an example embodiment, sensor systems 502, 504, 506, 508, and 510 may be configured to provide respective point cloud information that may relate to physical objects within the environment of the vehicle 500. While vehicle 500 and sensor systems 502, 504, 506, 508, and 510 are illustrated as including certain features, it will be understood that other types of sensor systems are contemplated within the scope of the present disclosure.

An example embodiment may include a system having a plurality of light-emitter devices. The system may include a transmit block of a LIDAR device. For example, the system may be, or may be part of, a LIDAR device of a vehicle (e.g., a car, a truck, a motorcycle, a golf cart, an aerial vehicle, a boat, etc.). Each light-emitter device of the plurality of light-emitter devices is configured to emit light pulses along a respective beam elevation angle. The respective beam elevation angles could be based on a reference angle or reference plane, as described elsewhere herein. In some embodiments, the reference plane may be based on an axis of motion of the vehicle 500.

While LIDAR systems with single light-emitter devices are described and illustrated herein, LIDAR systems with multiple light-emitter devices (e.g., a light-emitter device with multiple laser emitters on a single laser bar) are also contemplated. Additionally or alternatively, the LIDAR system could include multiple single laser dies that are placed proximate to one each other. In an example embodiment, light pulses emitted by one or more laser diodes may be controllably directed about an environment of the system. The angle of emission of the light pulses may be adjusted by a scanning device such as, for instance, a mechanical scanning mirror and/or a rotational motor. For example, the scanning devices could rotate in a reciprocating motion about a given axis and/or rotate about a vertical axis. In another embodiment, the light-emitter device may emit light pulses towards a spinning prism mirror, which may cause the light pulses to be emitted into the environment based on an angle of the prism mirror angle when interacting with each light pulse. Additionally or alternatively, scanning optics and/or other types of electro-opto-mechanical devices are possible to scan the light pulses about the environment.

In some embodiments, a single light-emitter device may emit light pulses according to a variable shot schedule and/or with variable power per shot, as described herein. That is, emission power and/or timing of each laser pulse or shot may be based on a respective elevation angle of the shot. Furthermore, the variable shot schedule could be based on providing a desired vertical spacing at a given distance from the LIDAR system or from a surface (e.g., a front bumper) of a given vehicle supporting the LIDAR system. As an example, when the light pulses from the light-emitter device are directed downwards, the power-per-shot could be decreased due to a shorter anticipated maximum distance to target. Conversely, light pulses emitted by the light-emitter device at an elevation angle above a reference plane may have a relatively higher power-per-shot so as to provide sufficient signal-to-noise to adequately detect pulses that travel longer distances.

In some embodiments, the power/energy-per-shot could be controlled for each shot in a dynamic fashion. In other embodiments, the power/energy-per-shot could be controlled for successive set of several pulses (e.g., 10 light pulses). That is, the characteristics of the light pulse train could be changed on a per-pulse basis and/or a per-several-pulse basis.

While FIG. 5 illustrates various LIDAR sensors attached to the vehicle 500, it will be understood that the vehicle 500 could incorporate other types of sensors, such as a plurality of optical systems, as described herein.

In an example embodiment, vehicle 500 could include one or more optical systems (e.g., optical system 100 as illustrated and described in relation to FIG. 1). The optical system could include a transmitter, which includes a light emitter device (e.g., light emitter device 120) configured to emit emission light. In such scenarios, the light emitter device could define a reference plane. The reference plane could be defined by, for example, a facet of a laser bar. The transmitter also includes a fast axis collimation (FAC) lens (FAC lens 130) that is optically coupled to the light emitter device. A lens axis of the FAC lens is at a non-zero angle with respect to the reference plane. As described herein, the lens axis could include a cylindrical axis of the FAC lens or a fast axis of the FAC lens. Adjusting an orientation or location of the FAC lens could be based on adjusting other axes of the FAC lens with respect to the reference plane and/or other features of the light emitter device.

The transmitter also include a transmit lens optically coupled to the FAC lens. The optical system also include a receiver, which could include a receive lens and a light detector optically coupled to the receive lens. In some embodiments, the transmit lens could be shaped based on, for example, a shape of the receive lens and/or a shape of the light detector. For instance, the transmit lens could have a square or rectangular shape. Alternatively or additionally, the transmit lens could have a round shape with a flat on one side. It will be understood that other shapes are possible.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

The specification includes the following subject-matter, expressed in the form of clauses 1-20. 1. A lidar system comprising: a transmitter comprising: a light emitter device configured to emit emission light, wherein the light emitter device defines a reference plane; a fast axis collimation (FAC) lens optically coupled to the light emitter device, wherein a lens axis of the FAC lens is at a non-zero angle with respect to the reference plane; and a transmit lens optically coupled to the FAC lens; and a receiver comprising: a receive lens; and a light detector optically coupled to the receive lens. 2. The lidar system of clause 1, wherein the FAC lens comprises a cylindrical lens, wherein the lens axis is defined by a cylindrical axis of the cylindrical lens. 3. The lidar system of clause 1, wherein the FAC lens comprises an acylindrical lens, wherein the lens axis is defined by a cylindrical axis of the acylindrical lens. 4. The lidar system of any of clauses 1-3, wherein the non-zero angle comprises a roll angle between 0 degrees and 0.5 degrees with respect to the reference plane. 5. The lidar system of any of clauses 1-3, wherein the non-zero angle comprises a roll angle between 0.5 degrees and 20 degrees with respect to the reference plane. 6. The lidar system of any of clauses 1-5, wherein the light emitter device comprises a laser diode bar. 7. The lidar system of clause 6, wherein the reference plane is defined by at least one surface of the laser diode bar. 8. The lidar system of clause 6 or 7, wherein the reference plane is defined by at least one surface of an active layer of the laser diode bar. 9. The lidar system of any of clauses 6-8, wherein an end facet of the laser diode bar defines a facet plane, wherein a fast axis of the FAC lens is not parallel to the facet plane. 10. The lidar system of clause 9, wherein the fast axis of the FAC lens forms a pitch angle between 0 degrees and 0.5 degrees with respect to the facet plane. 11. The lidar system of clause 9, wherein the fast axis of the FAC lens forms a pitch angle between 0.5 degrees and 20 degrees with respect to the facet plane. 12. The lidar system of any of clauses 6-11, wherein an end facet of the laser diode bar defines a facet plane, wherein a back plane of the FAC lens is not parallel to the facet plane. 13. The lidar system of clause 12, wherein the back plane of the FAC lens forms a yaw angle between 0 degrees and 0.5 degrees with respect to the facet plane. 14. The lidar system of clause 12, wherein the back plane of the FAC lens forms a yaw angle between five degrees and twenty degrees with respect to the facet plane. 15. The lidar system of any of clauses 1-14, wherein the non-zero angle is configured to center a beam profile of the emission light at the transmit lens. 16. The lidar system of any of clauses 1-15, wherein the FAC lens is fixed with respect to the light emitter device with at least one of: an adhesive, a curable epoxy, or a clamp. 17. The lidar system of any of clauses 1-16, wherein the light detector comprises a light detection area having a light detection area shape, wherein the receive lens has a shape that corresponds to the light detection area shape. 18. The lidar system of clause 17, wherein the light detection area shape is square or rectangular, wherein the receive lens has a square or rectangular shape, and wherein the transmit lens has a square or rectangular shape. 19. The lidar system of any of clauses 1-18, wherein the light detector comprises at least one of: a silicon photomultiplier (SiPM) device, a single photon avalanche photodiode (SPAD), an avalanche photodiode (APD), or a multi-pixel photon counter (MPPC). 20. A vehicle comprising: an optical system comprising: a transmitter, wherein the transmitter comprises: a light emitter device configured to emit emission light, wherein the light emitter device defines a reference plane; a fast axis collimation (FAC) lens optically coupled to the light emitter device, wherein a lens axis of the FAC lens is at a non-zero angle with respect to the reference plane; and a transmit lens optically coupled to the FAC lens; and a receiver, wherein the receiver comprises: a receive lens; and a light detector optically coupled to the receive lens. 21. A vehicle comprising: an optical system comprising the lidar system of any of clauses 1-19.

What is claimed is:

1. A lidar system comprising:
a transmitter comprising:
a light emitter device configured to emit emission light, wherein a surface of the light emitter device which emits the emission light defines a reference plane;
a fast axis collimation (FAC) lens optically coupled to the light emitter device, wherein a cylindrical axis of the FAC lens is at a non-zero angle with respect to the reference plane; and
a transmit lens optically coupled to the FAC lens; and
a receiver comprising:
a receive lens; and
a light detector optically coupled to the receive lens.

2. The lidar system of claim 1, wherein the FAC lens comprises a cylindrical lens.

3. The lidar system of claim 1, wherein the FAC lens comprises an acylindrical lens.

4. The lidar system of claim 1, wherein the light emitter device comprises a laser diode bar.

5. The lidar system of claim 4, wherein an end facet of the laser diode bar defines a facet plane, wherein a fast axis of the FAC lens is not parallel to the facet plane.

6. The lidar system of claim 5, wherein the fast axis of the FAC lens forms a pitch angle between 0 degrees and 0.5 degrees with respect to the facet plane.

7. The lidar system of claim 5, wherein the fast axis of the FAC lens forms a pitch angle between 0.5 degrees and 20 degrees with respect to the facet plane.

8. The lidar system of claim 4, wherein an end facet of the laser diode bar defines a facet plane, wherein a back plane of the FAC lens is not parallel to the facet plane.

9. The lidar system of claim 8, wherein the back plane of the FAC lens forms a yaw angle between 0 degrees and 0.5 degrees with respect to the facet plane.

10. The lidar system of claim 8, wherein the back plane of the FAC lens forms a yaw angle between five degrees and twenty degrees with respect to the facet plane.

11. The lidar system of claim 1, wherein the non-zero angle is configured to center a beam profile of the emission light at the transmit lens.

12. The lidar system of claim 1, wherein the FAC lens is fixed with respect to the light emitter device with at least one of: an adhesive, a curable epoxy, or a clamp.

13. The lidar system of claim 1, wherein the light detector comprises a light detection area having a light detection area shape, wherein the receive lens has a shape that corresponds to the light detection area shape.

14. The lidar system of claim 13, wherein the light detection area shape is square or rectangular, wherein the receive lens has a square or rectangular shape, and wherein the transmit lens has a square or rectangular shape.

15. The lidar system of claim 1, wherein the light detector comprises at least one of: a silicon photomultiplier (SiPM) device, a single photon avalanche photodiode (SPAD), an avalanche photodiode (APD), or a multi-pixel photon counter (MPPC).

16. A vehicle comprising:
an optical system comprising:
a transmitter, wherein the transmitter comprises:
a light emitter device configured to emit emission light, wherein a surface of the light emitter device which emits the emission light defines a reference plane;
a fast axis collimation (FAC) lens optically coupled to the light emitter device, wherein a cylindrical axis of the FAC lens is at a non-zero angle with respect to the reference plane; and
a transmit lens optically coupled to the FAC lens; and
a receiver, wherein the receiver comprises:
a receive lens; and
a light detector optically coupled to the receive lens.

17. The vehicle of claim 16, wherein the FAC lens comprises a cylindrical lens.

18. The vehicle of claim 16, wherein the FAC lens comprises an acylindrical lens.

19. The vehicle of claim 16, wherein the light emitter device comprises a laser diode bar.

20. The vehicle of claim 16, wherein an end facet of the laser diode bar defines a facet plane, wherein a back plane of the FAC lens is not parallel to the facet plane.

* * * * *